(12) United States Patent
Matsunaga (10) Patent No.: US 12,180,028 B2
(45) Date of Patent: Dec. 31, 2024

(54) IMAGE READING APPARATUS AND IMAGE FORMING APPARATUS

(71) Applicant: CANON KABUSHIKI KAISHA, Tokyo (JP)

(72) Inventor: Keisuke Matsunaga, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 204 days.

(21) Appl. No.: 17/835,290

(22) Filed: Jun. 8, 2022

(65) Prior Publication Data

US 2022/0407970 A1    Dec. 22, 2022

(30) Foreign Application Priority Data

Jun. 18, 2021   (JP) .................................. 2021-101994

(51) Int. Cl.
*B65H 5/06*    (2006.01)
*H04N 1/00*    (2006.01)

(52) U.S. Cl.
CPC ......... *B65H 5/062* (2013.01); *H04N 1/00572* (2013.01); *H04N 1/00602* (2013.01); *B65H 2403/20* (2013.01); *B65H 2801/39* (2013.01)

(58) Field of Classification Search
CPC .............. B65H 5/062; B65H 2301/544; B65H 2403/20; B65H 2404/16; B65H 2801/39; H04N 1/00572; H04N 1/00602
See application file for complete search history.

(56) References Cited

U.S. PATENT DOCUMENTS

| 2008/0265489 | A1* | 10/2008 | Ng ..................... H04N 1/00591 271/226 |
| 2014/0361481 | A1* | 12/2014 | Hong ...................... B65H 5/26 271/3.19 |
| 2017/0341886 | A1* | 11/2017 | Hishinuma ........ G03B 27/6264 |
| 2021/0274057 | A1 | 9/2021 | Matsunaga |
| 2022/0407971 | A1* | 12/2022 | Nishinohara ...... H04N 1/00602 |

FOREIGN PATENT DOCUMENTS

| JP | 2003-158884 A | 5/2003 |
| JP | 2005-067821 A | 3/2005 |

* cited by examiner

*Primary Examiner* — Prasad V Gokhale
(74) *Attorney, Agent, or Firm* — VENABLE LLP (57) ABSTRACT

An image reading apparatus includes a conveyance unit including a first driving roller and a second driving roller to convey a sheet, an image reading unit to read an image on the conveyed sheet at a reading position between the first driving roller and the second driving roller in a sheet conveyance direction, and a driving source to output a driving force for driving the first driving roller and the second driving roller. A first pulley is fixed to the first driving roller, a second pulley is fixed to the second driving roller, and a transmission belt is wound around the first pulley and the second pulley. An outer diameter of a belt-wound-part of the second pulley is smaller than an outer diameter of a belt-wound-part of the first pulley, the belt-wound-parts of the first pulley and the second pully being parts around which the transmission belt is wound respectively.

12 Claims, 10 Drawing Sheets

IMAGE READING APPARATUS AND IMAGE FORMING APPARATUS

BACKGROUND OF THE INVENTION

Field of the Invention

The present invention relates to an image reading apparatus that conveys a sheet and that reads an image from the sheet and to an image forming apparatus.

Description of the Related Art

An example of a copier, a facsimile machine, a multi-function peripheral, etc., is an image reading apparatus including an automatic document feeder (ADF) that conveys a sheet (document) to an image reading unit. The image reading apparatus carries out image reading of a sheet through a method by which a sheet is conveyed as an image is read therefrom (which is a process called feeding-reading). Such an image reading apparatus is provided with a plurality of conveyance roller pairs. A change in the conveyance speed of a sheet conveyed by eccentricity of these roller pairs raises a concern that a reading failure, such as a partial magnification ratio change and a color shift, may occur at a read image.

To deal with such a problem, an apparatus that transmits a driving torque from a motor to rollers via a timing belt and a pulley has been proposed. According to this apparatus, the pulley and the rollers are positioned such that the direction of eccentricity (deflection) of the pulley and the same of the rollers are opposite to each other (see Japanese Patent Laid-Open No. 2005-67821). Another apparatus that causes a photosensitive drum to rotate, using a timing belt, has also been proposed. According to this apparatus, a compensation factor for compensating a rotation change in one rotation of the timing belt is measured and motor driving control is carried out by using the compensation factor (see Japanese Patent Laid-Open No. 2003-158884).

However, the apparatus disclosed in Japanese Patent Laid-Open No. 2005-67821 requires that respective eccentricities of the rollers and the pulley be measured in advance and that the rollers and the pulley be set in phase with each other. These requirements pose a problem that an assembling process becomes complicated. In addition, in a case where the rollers need to be replaced, measuring eccentricities or matching phases on site is difficult, which raises a problem of lower maintenance efficiency.

The apparatus disclosed in Japanese Patent Laid-Open No. 2003-158884, on the other hand, needs to be equipped with a sensor, encoder, etc., for detecting a rotation change, which leads to a problem that the structure of the apparatus becomes complicated or the size of the apparatus increases. In addition, because a mark on the timing belt is detected to maintain a constant rotation speed, a change component in the direction of thrust of the timing belt acts as a disturbance component and affects the stability of the rotation speed, which is another problem.

SUMMARY OF THE INVENTION

The present invention provides an image reading apparatus and an image forming apparatus that can reduce a change in the speed of a roller, the change being caused by an eccentricity of the roller or a pulley, in a simple configuration.

According to a first aspect of the present invention, an image reading apparatus includes a conveyance unit including a first driving roller and a second driving roller and configured to convey a sheet, an image reading unit configured to read an image on the sheet conveyed by the conveyance unit at a reading position between the first driving roller and the second driving roller in a sheet conveyance direction, a driving source configured to output a driving force for driving the first driving roller and the second driving roller, a first pulley fixed to the first driving roller, a second pulley fixed to the second driving roller, and a transmission belt wound around the first pulley and the second pulley. An outer diameter of the second pulley is smaller than an outer diameter of the first pulley.

According to a second aspect of the present invention, an image forming apparatus includes a conveyance unit including a first driving roller and a second driving roller and configured to convey a sheet, an image reading unit configured to read an image on the sheet conveyed by the conveyance unit at a reading position between the first driving roller and the second driving roller in a sheet conveyance direction, a driving source configured to output a driving force for driving the first driving roller and the second driving roller, a first pulley fixed to the first driving roller, a second pulley fixed to the second driving roller, a transmission belt wound around the first pulley and the second pulley, and an image forming unit configured to form the image, read by the image reading unit from the sheet, on a different sheet. An outer diameter of the second pulley is smaller than an outer diameter of the first pulley.

Further features of the present invention will become apparent from the following description of exemplary embodiments with reference to the attached drawings.

DESCRIPTION OF THE EMBODIMENTS

Overall Configuration

Figure 1:
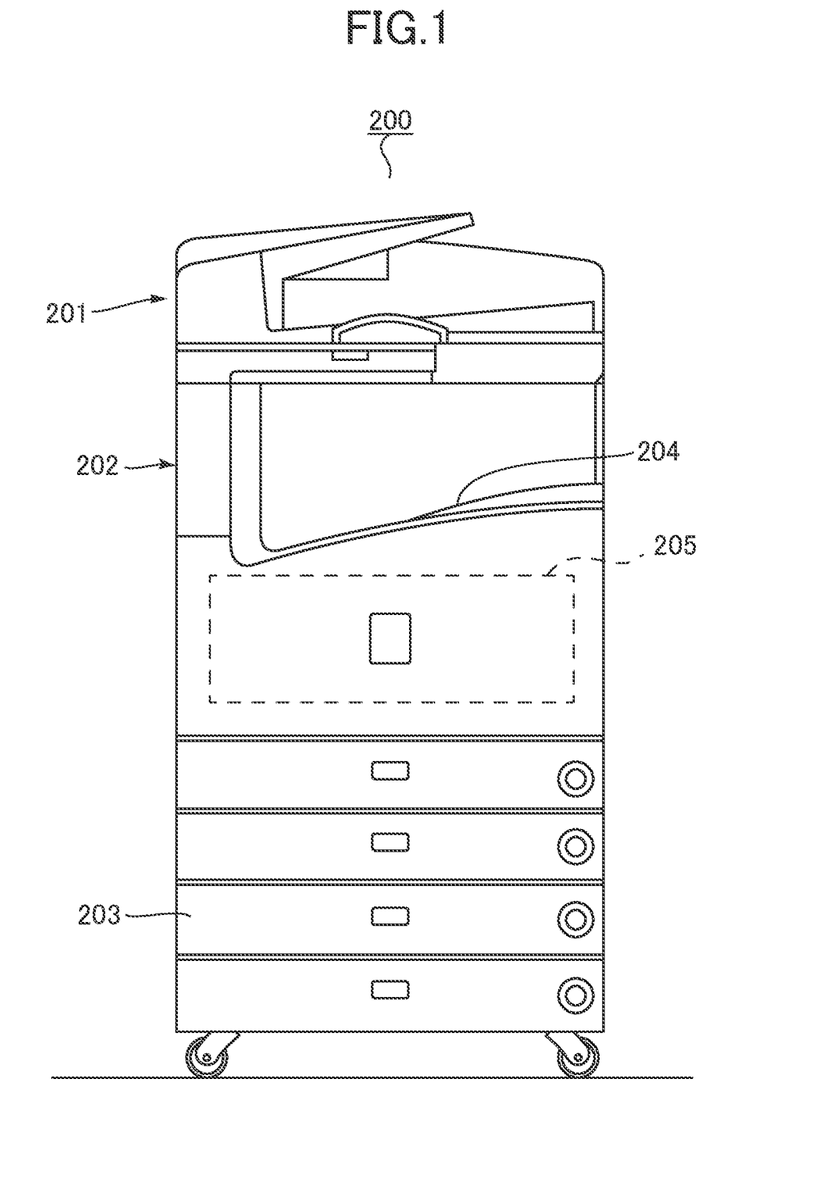
FIG. 1 is a general front view of an image forming apparatus according to a first embodiment.

An image forming apparatus 200 according to an embodiment is a multifunction peripheral working as an electrophotographic (laser beam) system. As shown in FIG. 1, the image forming apparatus 200 includes an apparatus body 202, and an image reading apparatus 201 mounted on the top of the apparatus body 202.

The apparatus body 202 includes an image forming unit 205 that forms an image on a sheet, and a cassette 203 that holds sheets fed to the image forming unit 205. Above the image forming unit 205, a sheet discharge tray 204 is provided, to which sheets are discharged. Sheets held in the cassette 203 are fed by a feeding roller (not illustrated) or the like. The image forming unit 205 has a laser writing unit, an electrophotographic processing unit, and a fixing unit which are built in the image forming unit 205 (and are not illustrated), and forms an image on a sheet by a known electrophotographic method, the sheet being fed from the cassette 203. The sheet on which an image is formed by the image forming unit 205 is different from a document from which the image reading apparatus 201 reads an image.

Image Reading Apparatus

Figure 2:
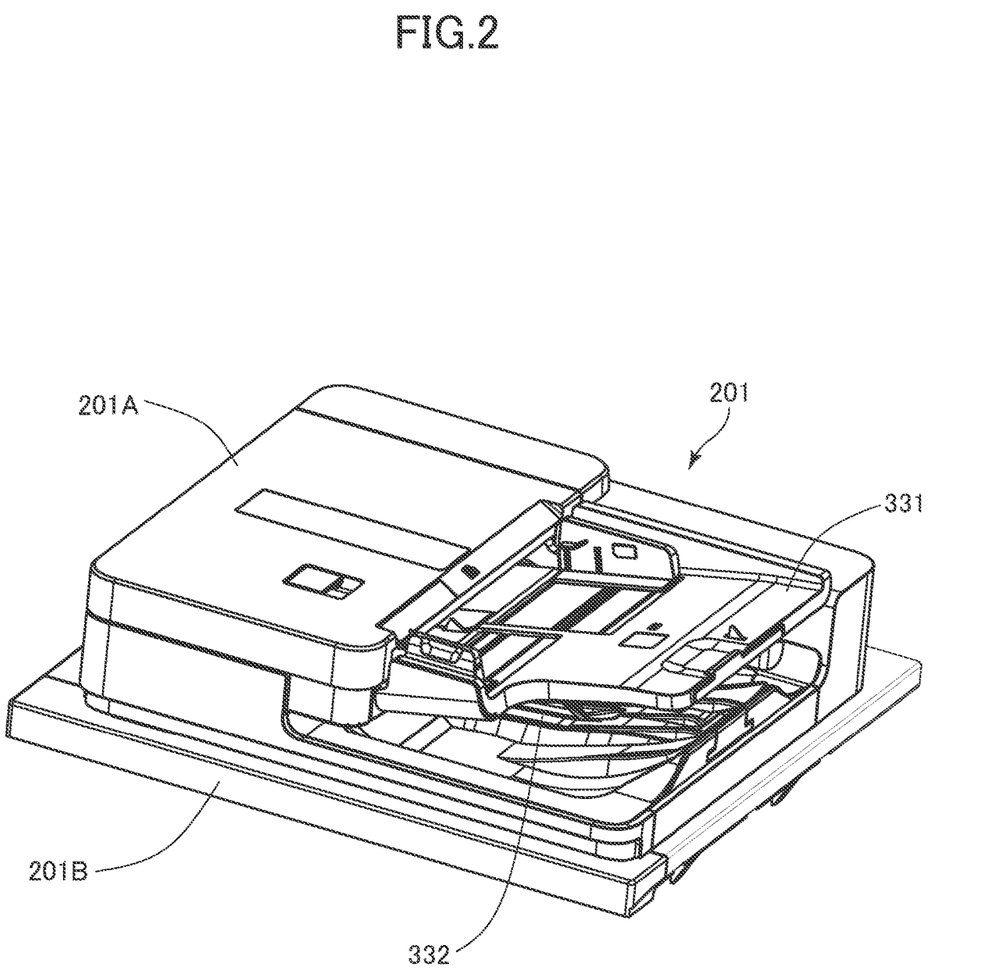
FIG. 2 is a perspective view of an image reading apparatus according to the first embodiment.
Figure 3:
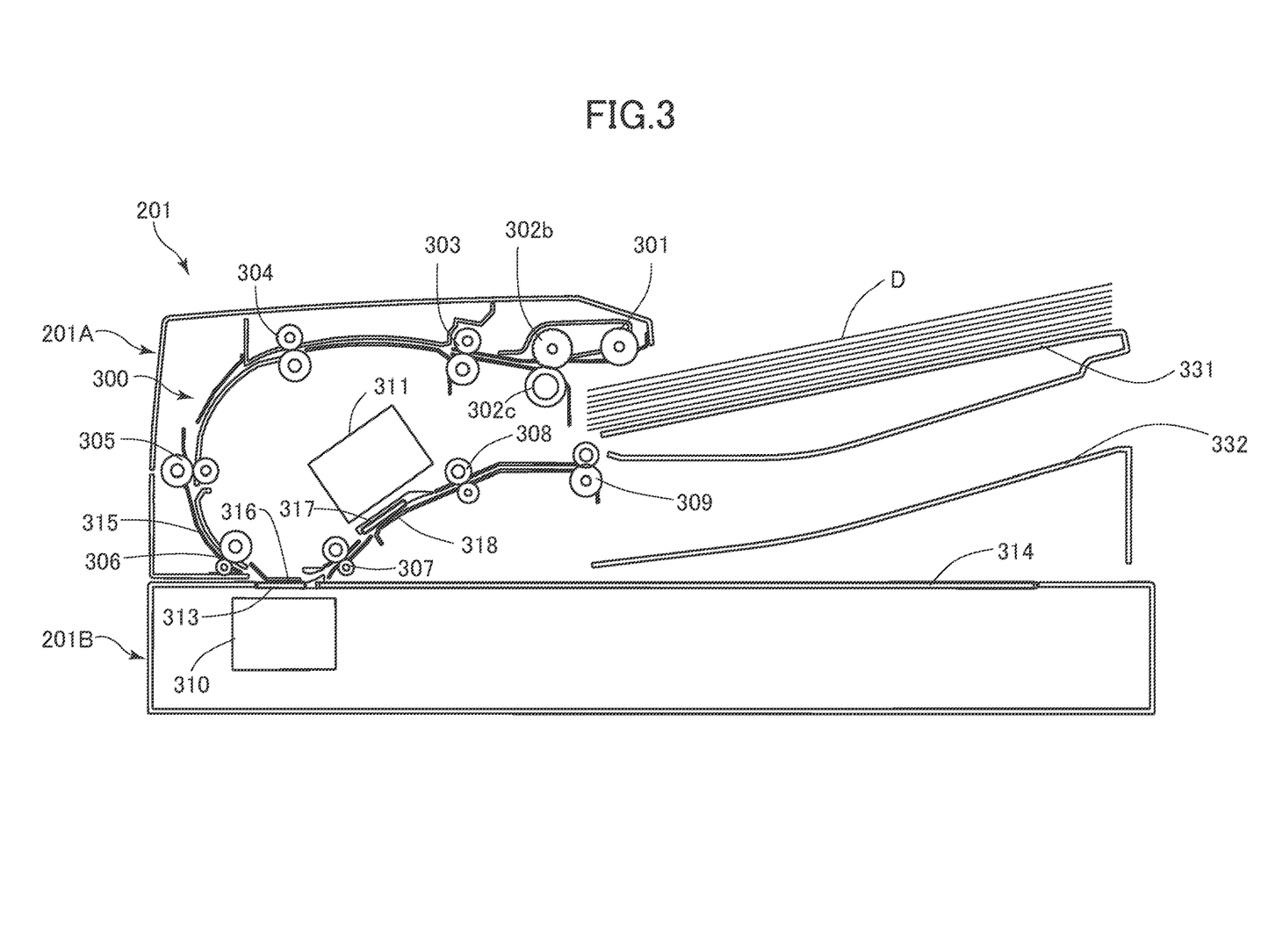
FIG. 3 is a sectional view of the image reading apparatus according to the first embodiment.

The image reading apparatus 201 will then be described in detail. As shown in FIGS. 2 and 3, the image reading apparatus 201 includes an automatic document feeder (hereinafter, "ADF") 201A that feeds documents D, which are sheets stacked on a document tray 331, and discharges documents D to a sheet discharge tray 332. The image reading apparatus 201 further includes a reading unit 201B that reads a document D conveyed by the ADF 201A. In this embodiment, a sheet refers to a recording material on which an image is formed by the image forming unit 205 and refers to a document from which an image is read by the image reading apparatus 201 as well. The document may be blank or may carry an image on its one surface or both surfaces. The ADF 201A is supported turnably on the reading unit 201B by a pivot such that a document-bearing glass 314 can be opened by turning the ADF 201A relative to the reading unit 201B.

The ADF 201A includes a pickup roller 301, a separation driving roller 302b and a separation driven roller 302c that make up a separation roller pair, a pullout conveyance roller pair 303, a pre-registration conveyance roller pair 304, and a registration roller pair 305. The ADF 201A further includes an upstream conveyance roller pair 306, an intermediate conveyance roller pair 307, a downstream conveyance roller pair 308, and a sheet discharge roller pair 309, which serve as conveyance units. The ADF 201A includes also an image reading unit 311 serving as a second image reading unit that reads a back surface opposite to a front surface of the document D, the back surface being a second surface of the document D. The reading unit 201B includes a platen glass 313, the document-bearing glass 314, and an image reading unit 310 serving as a first image reading unit that reads the front surface, i.e., a first surface of the document D. The image reading unit 310 is configured to read an image on the sheet conveyed by the conveyance unit at a reading position between the upstream conveyance roller pair 306 and the intermediate conveyance roller pair 307 in a sheet conveyance direction. The above roller pairs make up a conveyance unit 300 that conveys sheets.

The image reading apparatus 201 reads image information from the document D in the following operation modes: a feeding-reading mode in which an image on the document D is scanned as documents D stacked on the document tray 331 are fed by the ADF 201A and a fixed-reading mode in which the document placed on the document-bearing glass 314 is scanned. The feeding-reading mode, which is generally referred to as a sheet-through method, is selected when a document detection sensor (not illustrated) detects the document D placed on the document tray 331 or a user gives a clear instruction to execute the feeding-reading mode, using an operation panel, etc (not illustrated).

When the feeding-reading mode is executed, the pickup roller 301 moves down and comes in contact with the document D on the top of a stack of documents D on the document tray 331. The pickup roller 301 then feeds documents D to the roller pair composed of the separation driving roller 302b and the separation driven roller 302c, where the documents D are caught one by one by a separation nip formed by the separation driving roller 302b and the separation driven roller 302c. The separation driven roller 302c has a rotation support structure including a torque limiter, because of which the separation driven roller 302c rotates by following the separation driving roller 302b when one document is fed to the separation driven roller 302c, while the separation driven roller 302c does not rotate when two or more documents are fed to the separation driven roller 302c. Documents are thus separated one by one. The separation driven roller 302c may be supplied with a driving force that causes it to rotate in a direction opposite to a sheet feeding direction.

The document D having passed through the separation nip travels to the pullout conveyance roller pair 303 and the pre-registration conveyance roller pair 304, which convey the document D to the registration roller pair 305. Then, the leading edge of the document D runs into the registration roller pair 305 in a stopped state, where a skew position of the document D is corrected. The document D, whose skew position has been corrected, is further conveyed by the registration roller pair 305, thus traveling to the upstream conveyance roller pair 306 while being guided by a conveyance guide 315. The document D nipped by the upstream conveyance roller pair 306 is sent to a space between the platen glass 313 and a platen guide 318 serving as a guide member, where an image on the front surface is read by the image reading unit 310.

When the leading edge of the document D reaches the intermediate conveyance roller pair 307, the document D is nipped by the intermediate conveyance roller pair 307. The document D conveyed by the upstream conveyance roller pair 306 and the intermediate conveyance roller pair 307 travels into a space between a back surface reading glass 317 and a back surface reading guide 318. The document D then has an image on its back surface read by the image reading unit 311.

Afterward, when the leading edge of the document D reaches the downstream conveyance roller pair 308, the document D is nipped by the downstream conveyance roller pair 308. The document D is then conveyed to the sheet discharge roller pair 309 as the document D is held, by and large, by two or three of three roller pairs: the upstream conveyance roller pair 306, the intermediate conveyance roller pair 307, and the downstream conveyance roller pair 308, depending on the size of the document D. The document D, whose front surface and back surface have been read, is then discharged onto the sheet discharge tray 332. Image information, which is photoelectrically converted by light-receiving elements of line sensors of the image reading units 310 and 311, the light-receiving elements being CCDs or the like (not illustrated), is transferred to a control unit (not illustrated).

The fixed-reading mode is selected when the apparatus detects the document D placed on the document-bearing glass 314 or the user gives a clear instruction to execute the fixed-reading mode, using the operation panel, etc (not illustrated). In this case, the document D on the document-bearing glass 314 remains stationary, and the image reading unit 310 moves along the document-bearing glass 314 to scan the document D. As in the feeding-reading mode, image information, which is photoelectrically converted by the light-receiving element of the line sensor (not illustrated) of the image reading unit 310, is transferred to the control unit (not illustrated). Configuration of Each Conveyance Roller Pair and Driving Unit for Driving the Conveyance Roller Pair Configurations of the upstream conveyance roller pair 306, the intermediate conveyance roller pair 307, and the downstream conveyance roller pair 308, and the driving unit 400 that drive these roller pairs will then be described with reference to FIG. 4. As described above, in the image reading apparatus 201, the upstream conveyance roller pair 306, the intermediate conveyance roller pair 307, and the downstream conveyance roller pair 308 are arranged in this order from the upstream side to the downstream side in the sheet conveyance direction. The image reading unit 310, which reads the front surface, is disposed between the upstream conveyance roller pair 306 and the intermediate conveyance roller pair 307, and the image reading unit 311, which reads the back surface, is disposed between the intermediate conveyance roller pair 307 and the downstream conveyance roller pair 308. In other words, the upstream conveyance roller pair 306 is, among a plurality of roller pairs located upstream to the image reading unit 310 in the sheet conveyance direction, located closest to the image reading unit 310. The downstream conveyance roller pair 308 is, among a plurality of roller pairs located downstream to the image reading unit 311 in the sheet conveyance direction, located closest to the image reading unit 311. The intermediate conveyance roller pair 307 is located between the image reading unit 310 and the image reading unit 311.

Figure 4:
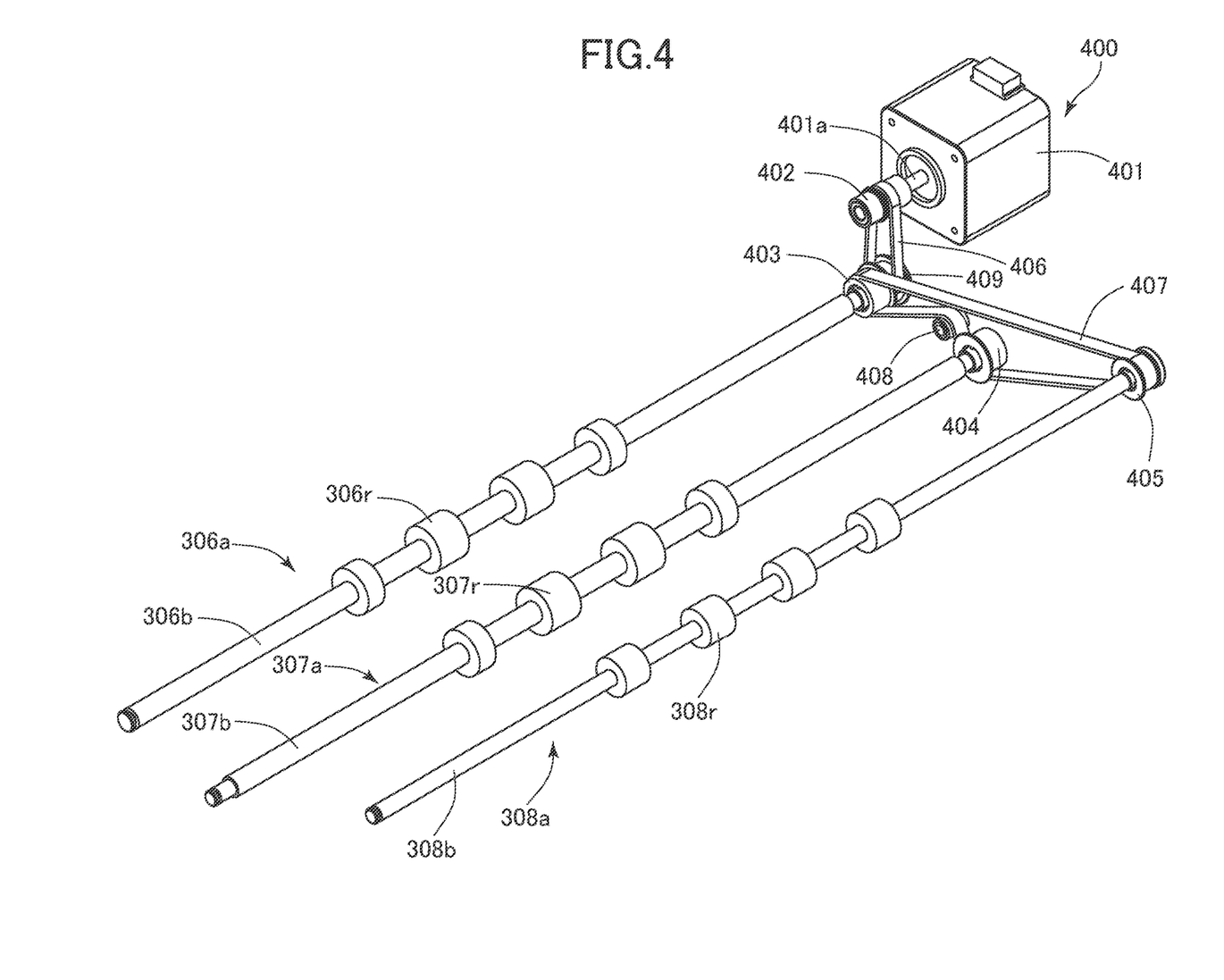
FIG. 4 is a perspective view of conveyance rollers and a driving unit according to the first embodiment.

The upstream conveyance roller pair 306 includes an upstream driving roller 306a, which is a first driving roller, and a driven roller (not illustrated), and the upstream driving roller 306a has a plurality of roller portions 306r fixed to a drive shaft 306b, the roller portions 306r coming in contact with the document D. Similarly, the intermediate conveyance roller pair 307 includes an intermediate driving roller 307a, which is a second driving roller, and a driven roller (not illustrated), and the intermediate driving roller 307a has a plurality of roller portions 307r fixed to a drive shaft 307b, the roller portions 307r coming in contact with the document D. The intermediate driving roller 307a is configured to convey the sheet next to the upstream driving roller 306a among the plurality of driving rollers. Similarly, the downstream conveyance roller pair 308 includes a downstream driving roller 308a, which is a third driving roller, and a driven roller (not illustrated), and the downstream driving roller 308a has a plurality of roller portions 308r fixed to a drive shaft 308b, the roller portions 308r coming in contact with the document D. The downstream driving roller 308a is configured to convey the sheet next to the intermediate driving roller 307a among the plurality of driving rollers.

The driving unit 400 includes a motor 401 serving as a driving source, and an output pulley 402 that is fixed to an output shaft 401a of the motor 401. The driving unit 400 further includes an upstream pulley 403 serving as a first pulley, the upstream pulley 403 being fixed to the drive shaft 306b of the upstream driving roller 306a. The driving unit 400 further includes an intermediate pulley 404 serving as a second pulley, the intermediate pulley 404 being fixed to the drive shaft 307b of the intermediate driving roller 307a. The driving unit 400 further includes a downstream pulley 405 serving as a third pulley, the downstream pulley 405 being fixed to the drive shaft 308b of the downstream driving roller 308a. The driving unit 400 further includes an input pulley 409 fixed to the drive shaft 307b of the intermediate driving roller 307a. The driving unit 400 includes a driving belt 406 wound around the output pulley 402 and the input pulley 409. The driving unit 400 further includes a transmission belt 407 wound around the upstream pulley 403 and the intermediate pulley 404. The driving unit 400 further includes a tension pulley 408 that gives the transmission belt 407 a tension.

In the present embodiment, as it will be described in detail later, the outer diameter (i.e., diameter) of the intermediate pulley 404 is made smaller than the outer diameter of the upstream pulley 403 and that of the downstream pulley 405, the upstream pulley 403 and downstream pulley 405 being pulleys different from the intermediate pulley 404, at a given ratio (i.e., predetermined ratio). In the present embodiment, the outer diameter of the upstream pulley 403 and that of the roller portion 306r are made equal to each other, and the outer diameter of the downstream pulley 405 and that of the roller portion 308r are made equal to each other. Further, the outer diameter of the intermediate pulley 404 is made equal to the outer diameter of the roller portion 307r, and is made smaller than the outer diameter of the upstream pulley 403 and that of the downstream pulley 405. That is, the outer diameter of the intermediate driving roller 307a is smaller than the outer diameter of the upstream driving roller 306a at the given ratio between the outer diameter of the upstream driving roller 306a and the outer diameter of the intermediate driving roller 307a. In the present embodiment, the outer diameter of each pulley and the outer diameter of the corresponding roller portion are made equal to each other. However, what is required is that each ratio between the outer diameter speed of a pulley and the outer diameter speed of a roller be the same so that no difference in the sheet conveyance speed of each roller portion arises. In other words, to prevent a case where a difference in the sheet conveyance speed of each roller portion arises, the outer diameter of each pulley and the outer diameter of the corresponding roller portion may be reduced or increased at the same ratio. In the present embodiment, an outer diameter of a pulley is an outer diameter of a portion of the pulley, the portion contacting with a belt.

At the driving unit 400 configured in the above manner, when the motor 401 rotates to output a driving force, a torque is inputted to the input pulley 409 via the output pulley 402 and the driving belt 406. The torque is thus transmitted to the upstream pulley 403 to which the input pulley 409 is fixed. This causes the upstream driving roller 306a to rotate, and at the same time, the torque transmitted to the intermediate pulley 404 and the downstream pulley 405 via the transmission belt 407 causes the intermediate driving roller 307a and the downstream driving roller 308a to rotate.

The drive shaft 306b of the upstream driving roller 306a, the drive shaft 307b of the intermediate driving roller 307a, the drive shaft 308b of the downstream driving roller 308a, the upstream pulley 403, the intermediate pulley 404, and the downstream pulley 405 may have eccentricities, respectively. Transmission of the torque to these components through the transmission belt 407 causes speed changes (so-called deflection) due to respective eccentricities of the components, which speed changes combine to give rise to a change in an angular velocity. As a result, the surface speed of each roller changes, which leads to an image reading failure, such as a partial magnification ratio change and a color shift. Such a reading failure is prevented by a method described below.

Outer Diameter of Each Pulley and Change in Angular Velocity of Each Roller

Figure 5:
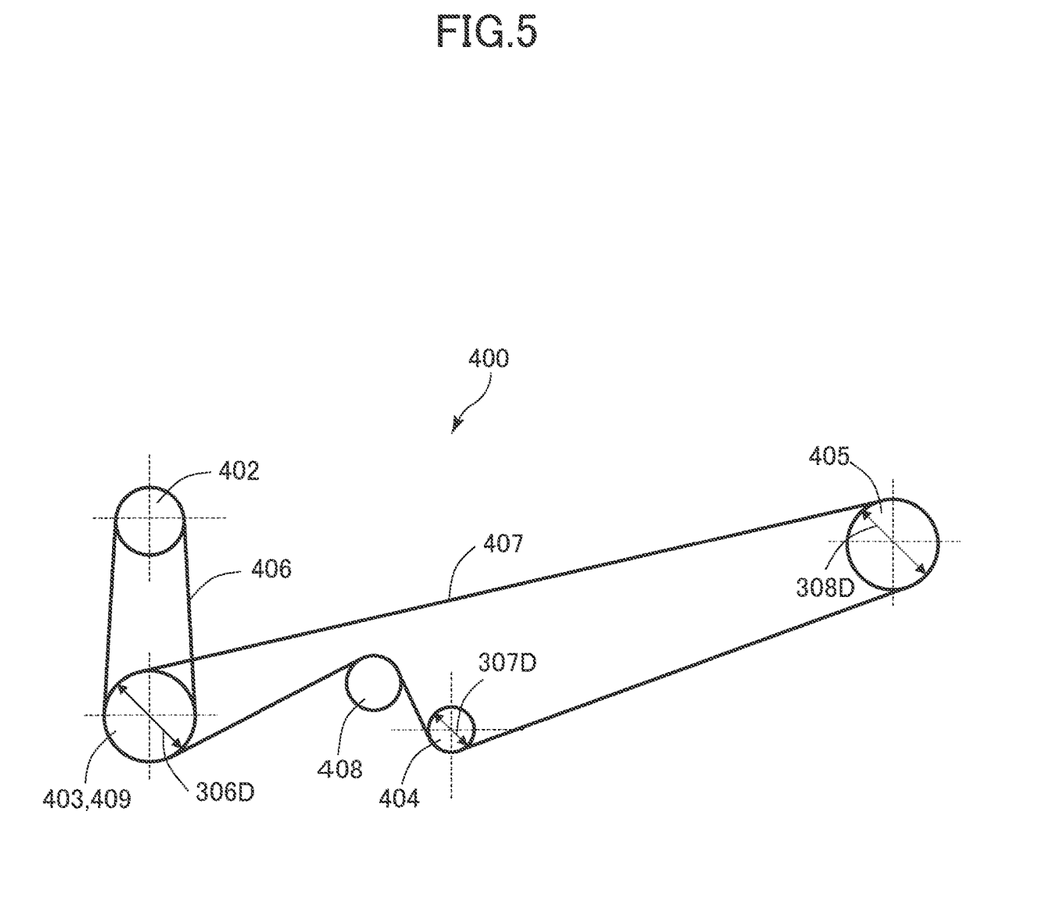
FIG. 5 is a schematic diagram of conveyance rollers and belts according to the first embodiment.
Figure 6A:
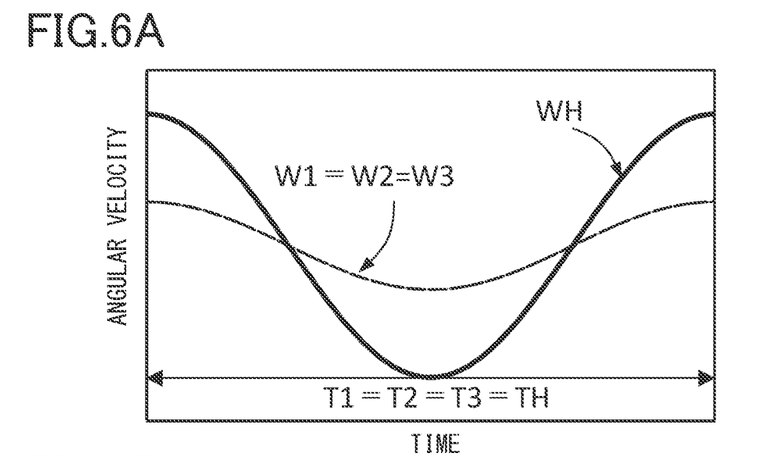
FIG. 6A is a graph showing changes in an angular velocity in a case where respective outer diameters of pulleys are the same.

The outer diameter of each pulley and a change in the angular velocity of each roller will then be described with reference to FIGS. 5 to 7. As shown in FIG. 5, the outer diameter of the upstream pulley 403, which is equal to the outer diameter of the roller portion 306r of the upstream driving roller 306a (see FIG. 4), is an outer diameter 306D. The outer diameter of the intermediate pulley 404, which is equal to the outer diameter of the roller portion 307r of the intermediate driving roller 307a (see FIG. 4), is an outer diameter 307D. The outer diameter of the downstream pulley 405, which is equal to the outer diameter of the roller portion 308r of the downstream driving roller 308a (see FIG. 4), is an outer diameter 308D.

It is assumed, for example, that the outer diameter 306D of the upstream pulley 403, the outer diameter 307D of the intermediate pulley 404, and the outer diameter 308D of the downstream pulley 405 are equal to each other (306D=307D=308D). In this case, as shown in FIG. 6A, a period T1 of changes in the angular velocity of the upstream pulley 403, a period T2 of changes in the angular velocity of the intermediate pulley 404, and a period T3 of changes in the angular velocity of the downstream pulley 405 are equal to each other, i.e., the same period TH. Now, because the upstream pulley 403, the intermediate pulley 404, and the downstream pulley 405 are driven by a single motor 401 and are connected to each other by a single transmission belt 407, changes in respective angular velocities of the upstream pulley 403, the intermediate pulley 404, and the downstream pulley 405 may be synthesized in the same phase. Specifically, an amplitude WH of a synthesized angular velocity, the amplitude WH being given by synthesizing an amplitude W1 of an angular velocity of the upstream pulley 403, an amplitude W2 of an angular velocity of the intermediate pulley 404, and an amplitude W3 of an angular velocity of the downstream pulley 405, is at most 3 times as large as the amplitude of an angular velocity of each pulley. Respective surface speeds of the roller portion 306r of the upstream driving roller 306a, the roller portion 307r of the intermediate driving roller 307a, and the roller portion 308r of the downstream driving roller 308a are proportional to the amplitude WH of the synthesized angular velocity, and therefore constitutes a cause for the above-mentioned image reading failure.

To deal with this problem, according to the first embodiment, a ratio between the outer diameter 306D of the upstream pulley 403 (which outer diameter 306D is equal to the outer diameter 308D of the downstream pulley 405) and the outer diameter 307D of the intermediate pulley 404 is set as a given ratio of 2:1, which means that the outer diameter 307D of the intermediate pulley 404 is determined to be the half of the outer diameter 306D of the upstream pulley 403, as shown in FIG. 5. As a result, as shown in FIG. 6B, the period T2 of changes in the angular velocity of the intermediate pulley 404 becomes ½ of the period $T_1$ of changes in the angular velocity of the upstream pulley 403, the period $T_1$ being a reference period. As a result, when the angular velocities are synthesized, an amplitude A1 of the angular velocity of the intermediate pulley 404 cancels out amplitudes of the angular velocities of other pulleys, which reduces the maximum of the amplitude WH of the synthesized angular velocity.

It is preferable that the outer diameter 308D of the downstream pulley 405 be equal to the outer diameter 306D of the upstream pulley 403. The outer diameter 308D, however, may be equal to the outer diameter 307D of the intermediate pulley 404. In the first embodiment, the ratio between the outer diameter 306D of the upstream pulley 403 (which outer diameter 306D is equal to the outer diameter 308D of the downstream pulley 405) and the outer diameter 307D of the intermediate pulley 404 is set 2:1, which is the given ratio. However, the given ratio may be 2n:1, where n represents an integer of 2 or more. In this case, the period T2 of changes in the angular velocity of the intermediate pulley 404 is ½n of the reference period, and in the same manner as described above, the amplitude A1 of the angular velocity of the intermediate pulley 404 cancels out amplitudes of the angular velocities of other pulleys.

In the first embodiment, the outer diameter of each pulley and the outer diameter of the corresponding roller portion are made equal to each other. This prevents an increase or decrease in the surface speed of the roller portion relative to the surface speed of the pulley, that is, keeps the surface speed of the roller portion equal to the surface speed of the pulley. In this case, even if the pulleys are not aligned in their eccentric phases, a change in the angular velocity can be reduced to be 15% to 30% smaller than a change in the angular velocity in the case where the outer diameter 307D of the intermediate pulley 404 is equal to the outer diameter 306D of the upstream pulley 403 (the outer diameter 308D of the downstream pulley 405).

Effects of reducing a change in the roller surface speed will then be described with reference to FIG. 7. When the outer diameters of the upstream pulley 403, the intermediate pulley 404, and the downstream pulley 405 are the same, that is, when the period relationship of FIG. 6A holds, changes in the surface speed of the roller portion 306r of the upstream driving roller 306a remain in a range of an amplitude V11, as shown in FIG. 7A. Likewise, when the outer diameters of the upstream pulley 403, the intermediate pulley 404, and the downstream pulley 405 are the same, that is, when the period relationship of FIG. 6A holds, changes in the surface speed of the roller portion 307r of the intermediate driving roller 307a remain in a range of an amplitude V21, as shown in FIG. 7B. Further, when the outer diameters of the upstream pulley 403, the intermediate pulley 404, and the downstream pulley 405 are the same, that is, when the period relationship of FIG. 6A holds, changes in the surface speed of the roller portion 308r of the downstream driving roller 308a remain in a range of an amplitude V31, as shown in FIG. 7C.

Figure 6B:
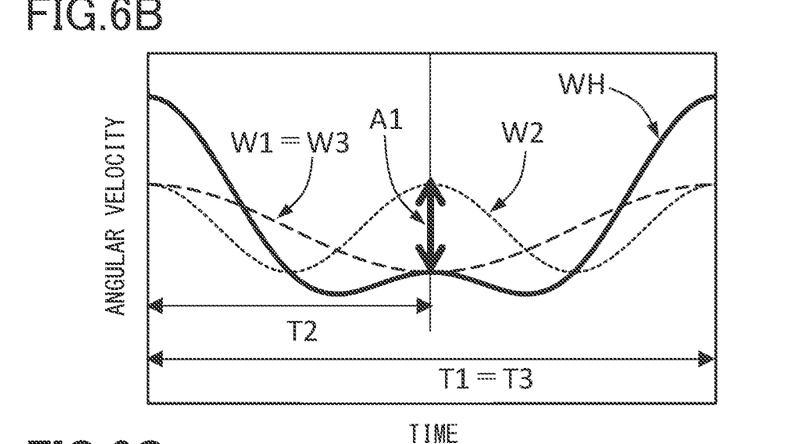
FIG. 6B is a graph showing changes in the angular velocity in a case where a ratio between the outer diameter of a pulley for an intermediate conveyance roller and the outer diameter of a different pulley is 1:2n.
Figure 6C:
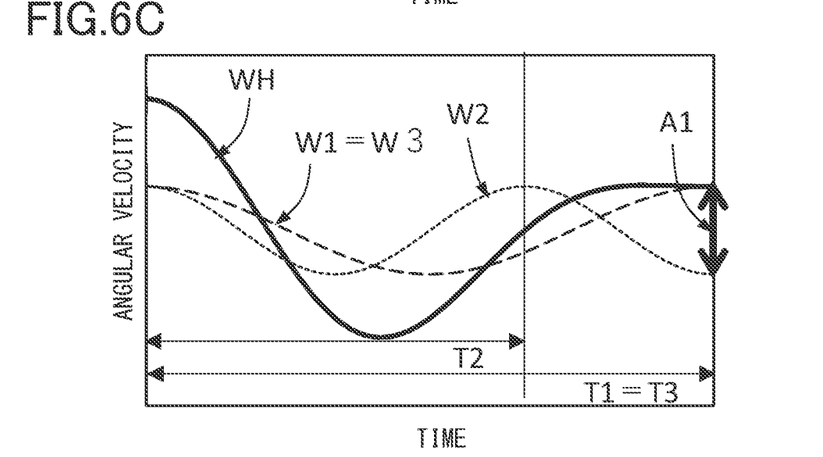
FIG. 6C is a graph showing changes in the angular velocity in a case where the ratio between the outer diameter of the pulley for the intermediate conveyance roller and the outer diameter of a different pulley is 2:2n+1.
Figure 7A:
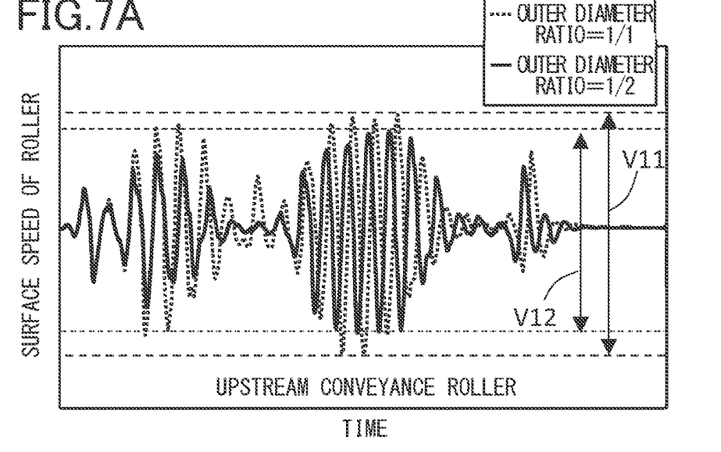
FIG. 7A is a graph showing a surface speed of an upstream conveyance roller in a case where respective outer diameters of pulleys are the same and showing a surface speed of the upstream conveyance roller in a case where a ratio between the outer diameter of the pulley for the intermediate conveyance roller and the outer diameter of a different pulley is 1:2n.
Figure 7B:
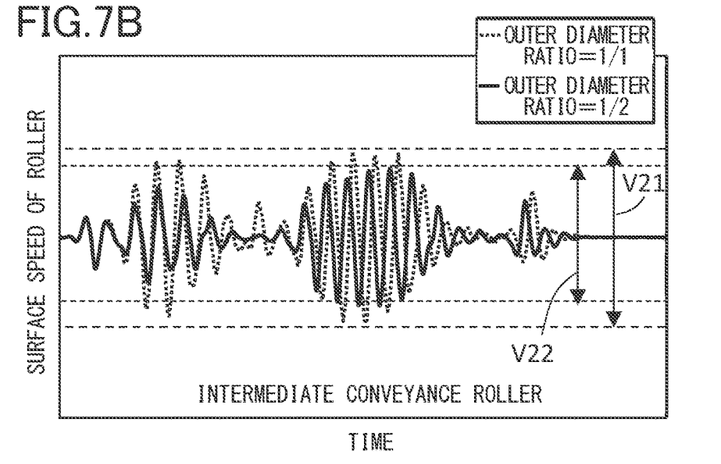
FIG. 7B is a graph showing a surface speed of the intermediate conveyance roller in a case where respective outer diameters of pulleys are the same and showing a surface speed of the intermediate conveyance roller in a case where a ratio between the outer diameter of the pulley for the intermediate conveyance roller and the outer diameter of a different pulley is 1:2n.
Figure 7C:
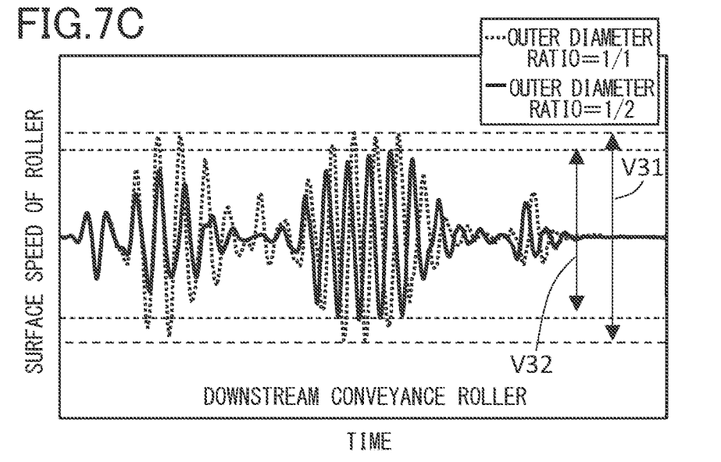
FIG. 7C is a graph showing a surface speed of a downstream conveyance roller in a case where respective outer diameters of pulleys are the same and showing a surface speed of the downstream conveyance roller in a case where a ratio between the outer diameter of the pulley for the intermediate conveyance roller and the outer diameter of a different pulley is 1:2n.

In contrast, when the outer diameter of the intermediate pulley 404 is ½ of the outer diameter of the upstream pulley 403 (downstream pulley 405), that is, when the period relationship of FIG. 6B holds, changes in the surface speed of the roller portion 306r of the upstream driving roller 306a remain in a range of an amplitude V12, as shown in FIG. 7A. Likewise, when the outer diameter of the intermediate pulley 404 is ½ of the outer diameter of the upstream pulley 403 (downstream pulley 405), that is, when the period relationship of FIG. 6B holds, changes in the surface speed of the roller portion 307r of the intermediate driving roller 307a remain in a range of an amplitude V22, as shown in FIG. 7B. Further, when the outer diameter of the intermediate pulley 404 is ½ of the outer diameter of the upstream pulley 403 (downstream pulley 405), that is, when the period relationship of FIG. 6B holds, changes in the surface speed of the roller portion 308r of the downstream driving roller 308a remain in a range of an amplitude V32, as shown in FIG. 7C. These figures demonstrate that amplitudes indicating changes in the roller surface speed can be reduced for all of three roller pairs:the upstream conveyance roller pair 306, the intermediate conveyance roller pair 307, and the downstream conveyance roller pair 308. Hence, in a simple configuration in which the outer diameters of the intermediate pulley 404 and the intermediate conveyance roller pair 307 are reduced at the given ratio, a change in the surface speed of the rollers can be reduced.

Modification of First Embodiment

In a modification of the first embodiment, the ratio between the outer diameter 306D of the upstream pulley 403 (which outer diameter 306D is equal to the outer diameter 308D of the downstream pulley 405) and the outer diameter 307D of the intermediate pulley 404 may be set as a given ratio of 3:2. In this case, as shown in FIG. 6C, the period T2 of changes in the angular velocity of the intermediate pulley 404 becomes ⅔ of the period $T_1$ of changes in the angular velocity of the upstream pulley 403, the period $T_1$ being a reference period. As a result, when the angular velocities are synthesized, an amplitude A1 of the angular velocity of the intermediate pulley 404 cancels out amplitudes of the angular velocities of other pulleys, which reduces the maximum of the amplitude WH of the synthesized angular velocity.

In this modification, the ratio between the outer diameter 306D of the upstream pulley 403 (which outer diameter 306D is equal to the outer diameter 308D of the downstream pulley 405) and the outer diameter 307D of the intermediate pulley 404 is set 3:2, which is the given ratio. However, the given ratio may be 2n+1:2, where n represents an integer of 2 or more. In this case, the period T2 of changes in the angular velocity of the intermediate pulley 404 is 2/2n+1 of the reference period, and in the same manner as described above, the amplitude A1 of the angular velocity of the intermediate pulley 404 cancels out amplitudes of the angular velocities of other pulleys. In this modification, even if the pulleys are not aligned in their eccentric phases, a change in the angular velocity can be reduced to be 5% to 10% smaller than a change in the angular velocity in the case where the outer diameter 307D of the intermediate pulley 404 is equal to the outer diameter 306D of the upstream pulley 403 (the outer diameter 308D of the downstream pulley 405).

Second Embodiment

Figure 8:
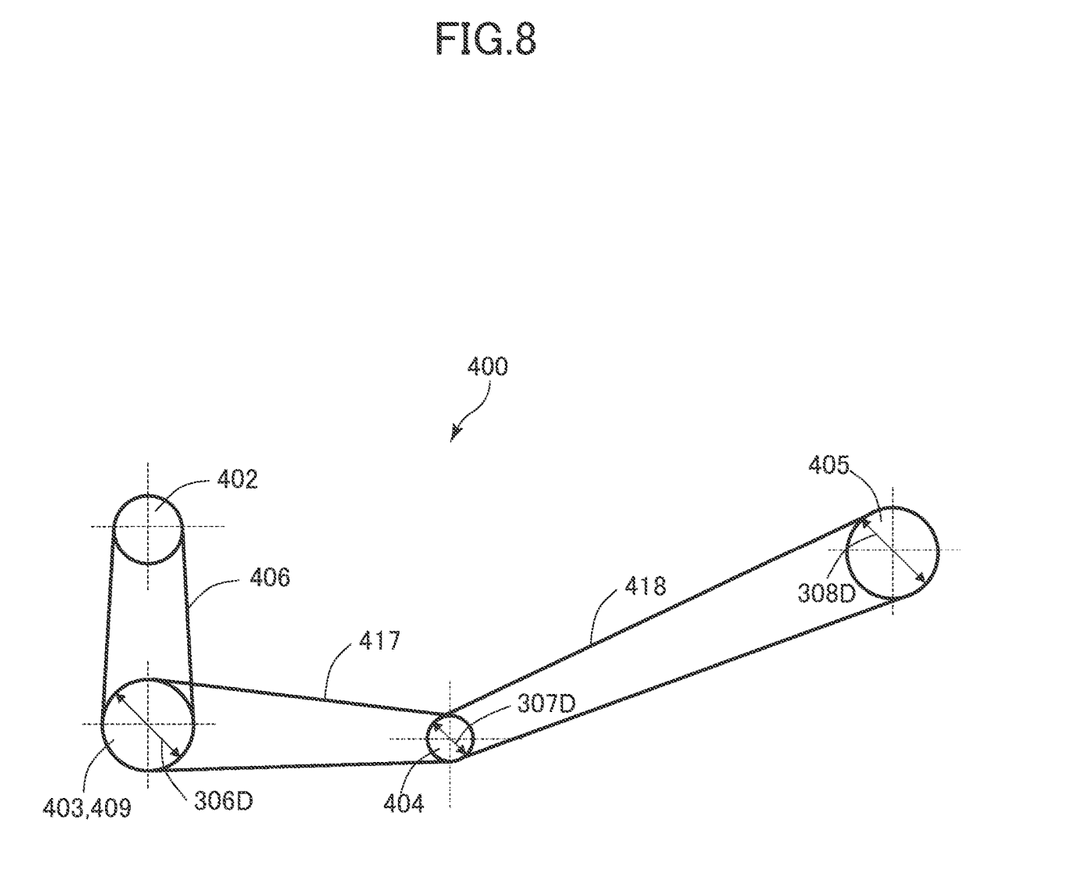
FIG. 8 is a schematic diagram of conveyance rollers and belts according to a second embodiment.

A second embodiment, which is a partial modification of the first embodiment, will then be described with reference to FIG. 8. In description of the second embodiment, the same components as described in the first embodiment will be denoted by the same reference numerals and will be omitted in further description.

The second embodiment is different from the first embodiment in the configuration of the transmission belts in the driving unit 400. In the first embodiment, one transmission belt 407 is wound around the upstream pulley 403, the intermediate pulley 404, and the downstream pulley 405. In the second embodiment, on the other hand, two transmission belts make up a transmission belt wound around the upstream pulley 403, the intermediate pulley 404, and the downstream pulley 405, as shown in FIG. 8.

Specifically, in the driving unit 400, the driving belt 406 is wound around the output pulley 402 fixed to the output shaft 401a (see FIG. 4) of the motor 401 and around an input pulley 409. An upstream transmission belt 417, which serves as a first transmission belt, is wound around the upstream pulley 403 and the intermediate pulley 404, and a downstream transmission belt 418, which serves as a second transmission belt, is wound around the intermediate pulley 404 and the downstream pulley 405. The driving unit 400 configured in this manner transmits a torque of the motor 401 to the input pulley 409 via the output pulley 402 and the driving belt 406, thus transmitting the torque to the upstream pulley 403 to which the input pulley 409 is fixed. The torque transmitted to the upstream pulley 403 is transmitted to the intermediate pulley 404 via the upstream transmission belt 417. The torque transmitted to the intermediate pulley 404 is further transmitted to the downstream pulley 405 via the downstream transmission belt 418.

In the second embodiment, the ratio between the outer diameter 306D of the upstream pulley 403 (which outer diameter 306D is equal to the outer diameter 308D of the downstream pulley 405) and the outer diameter 307D of the intermediate pulley 404 is set as a given ratio of 2:1, which means that the outer diameter 307D of the intermediate pulley 404 is determined to be half of the outer diameter 306D of the upstream pulley 403, in the same manner as in the first embodiment. Alternatively, the ratio between the outer diameter 306D of the upstream pulley 403 (which outer diameter 306D is equal to the outer diameter 308D of the downstream pulley 405) and the outer diameter 307D of the intermediate pulley 404 is set as a given ratio of 3:2, which means that the outer diameter 307D of the intermediate pulley 404 is determined to be 2/3 of the outer diameter 306D of the upstream pulley 403. The above given ratio may be 2n: 1 or 2n+1:2, as is in the first embodiment.

According to the driving unit 400 of the second embodiment configured in this manner, a change in the surface speed of the rollers can be reduced in a simple configuration in which the outer diameters of the intermediate pulley 404 and the intermediate conveyance roller pair 307 are reduced at the given ratio. Except this respect, the second embodiment is identical with the first embodiment in configuration, operation, and effect, and therefore description of the configuration, operation, and effect of the second embodiment will be omitted.

Third Embodiment

Figure 9:
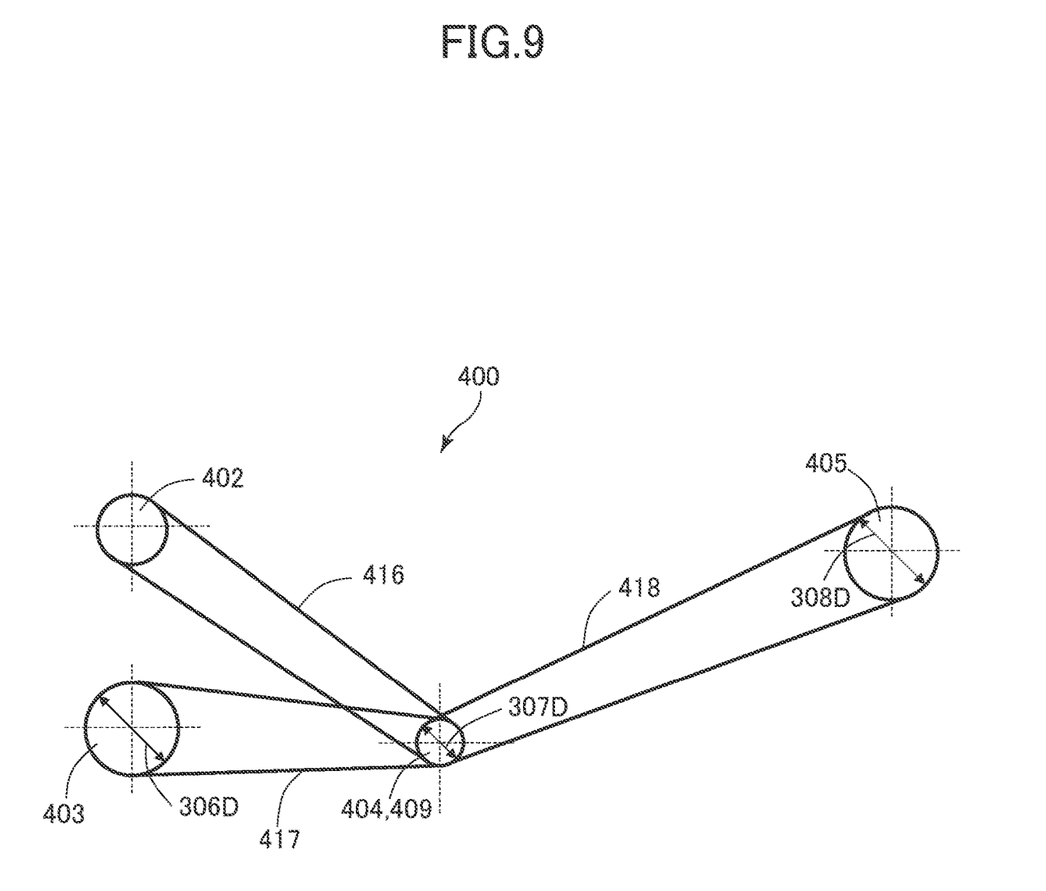
FIG. 9 is a schematic diagram of conveyance rollers and belts according to a third embodiment.

A third embodiment, which is a partial modification of the second embodiment, will then be described with reference to FIG. 9. In description of the third embodiment, the same components as described in the first and second embodiments will be denoted by the same reference numerals and will be omitted in further description.

The third embodiment is different from the second embodiment in the configuration of the driving belts in the driving unit 400. In the second embodiment, the input pulley 409 is fixed to the upstream pulley 403. In the third embodiment, on the other hand, the input pulley 409 is fixed to the intermediate pulley 404, as shown in FIG. 9.

The driving unit 400 configured in this manner transmits a torque of the motor 401 to the input pulley 409 via the output pulley 402 and a driving belt 416, thus transmitting the torque to the intermediate pulley 404 to which the input pulley 409 is fixed. The torque transmitted to the intermediate pulley 404 is transmitted to the upstream pulley 403 via the upstream transmission belt 417. The torque transmitted to the intermediate pulley 404 is further transmitted to the downstream pulley 405 via the downstream transmission belt 418.

In the third embodiment, the ratio between the outer diameter 306D of the upstream pulley 403 (which outer diameter 306D is equal to the outer diameter 308D of the downstream pulley 405) and the outer diameter 307D of the intermediate pulley 404 is set as a given ratio of 2:1, which means that the outer diameter 307D of the intermediate pulley 404 is determined to be the half of the outer diameter 306D of the upstream pulley 403, in the same manner as in the first and second embodiments. Alternatively, the ratio between the outer diameter 306D of the upstream pulley 403 (which outer diameter 306D is equal to the outer diameter 308D of the downstream pulley 405) and the outer diameter 307D of the intermediate pulley 404 is set as a given ratio of 3:2, which means that the outer diameter 307D of the intermediate pulley 404 is determined to be 2/3 of the outer diameter 306D of the upstream pulley 403. The above given ratio may be 2n: 1 or 2n+1:2, as is in the first embodiment.

According to the driving unit 400 of the third embodiment configured in this manner, a change in the surface speed of the rollers can be reduced in a simple configuration in which the outer diameters of the intermediate pulley 404 and the intermediate conveyance roller pair 307 are reduced at the given ratio. Except this respect, the third embodiment is identical with the first and second embodiments in configuration, operation, and effect, and therefore description of the configuration, operation, and effect of the third embodiment will be omitted.

Fourth Embodiment

Figure 10:
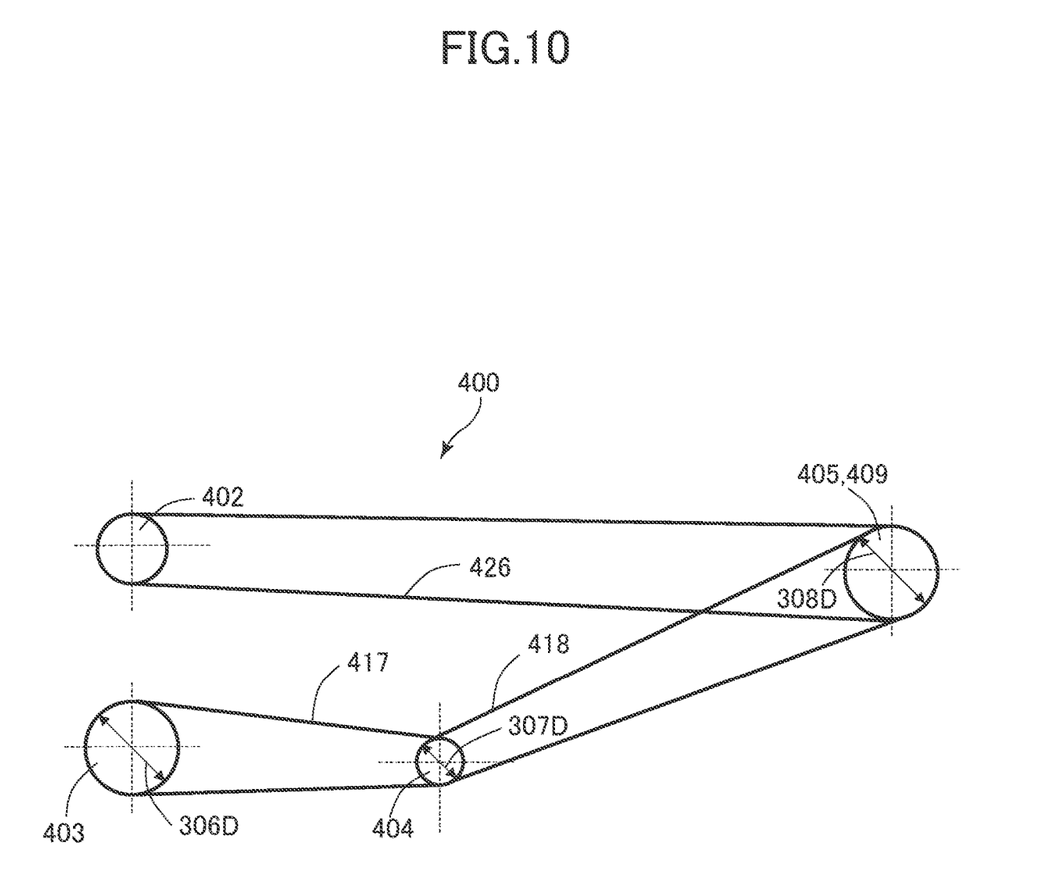
FIG. 10 is a schematic diagram of conveyance rollers and belts according to a fourth embodiment.

A fourth embodiment, which is a partial modification of the second embodiment, will then be described with reference to FIG. 10. In description of the fourth embodiment, the same components as described in the first to third embodiments will be denoted by the same reference numerals and will be omitted in further description.

The fourth embodiment is different from the second embodiment in the configuration of the driving belts in the driving unit 400. In the second embodiment, the input pulley 409 is fixed to the upstream pulley 403. In the fourth embodiment, on the other hand, the input pulley 409 is fixed to the downstream pulley 405, as shown in FIG. 10.

The driving unit 400 configured in this manner transmits a torque of the motor 401 to the input pulley 409 via the output pulley 402 and a driving belt 426, thus transmitting the torque to the downstream pulley 405 to which the input pulley 409 is fixed. The torque transmitted to the downstream pulley 405 is transmitted to the intermediate pulley 404 via the downstream transmission belt 418. The torque transmitted to the intermediate pulley 404 is further transmitted to the upstream pulley 403 via the upstream transmission belt 417.

In the fourth embodiment, the ratio between the outer diameter 306D of the upstream pulley 403 (which outer diameter 306D is equal to the outer diameter 308D of the downstream pulley 405) and the outer diameter 307D of the intermediate pulley 404 is set as a given ratio of 2:1, which means that the outer diameter 307D of the intermediate pulley 404 is determined to be half of the outer diameter 306D of the upstream pulley 403, in the same manner as in the first to third embodiments. Alternatively, the ratio between the outer diameter 306D of the upstream pulley 403 (which outer diameter 306D is equal to the outer diameter 308D of the downstream pulley 405) and the outer diameter 307D of the intermediate pulley 404 is set as a given ratio of 3:2, which means that the outer diameter 307D of the intermediate pulley 404 is determined to be 2/3 of the outer diameter 306D of the upstream pulley 403. The above given ratio may be 2n: 1 or 2n+1:2, as is in the first embodiment.

According to the driving unit 400 of the fourth embodiment configured in this manner, a change in the surface speed of the rollers can be reduced in a simple configuration in which the outer diameters of the intermediate pulley 404 and the intermediate conveyance roller pair 307 are reduced at the given ratio. Except this respect, the fourth embodiment is identical with the first to third embodiments in configuration, operation, and effect, and therefore description of the configuration, operation, and effect of the fourth embodiment will be omitted.

Possibility of Other Embodiments

In the above first to fourth embodiments, described are the image reading apparatus 201 including two image reading units, i.e., the image reading unit 310 for reading an image on the front surface and the image reading unit 311 for reading an image on the back surface. The image reading apparatus 201, however, may include only one image reading unit. In this case, the first driving roller is disposed upstream to the one image reading unit and the second driving roller is disposed downstream to the same, and the first pulley and the second pulley are fixed to the first driving roller and the second driving roller, respectively. In this configuration, respective outer diameters of the other roller and the other pulley are made smaller than respective outer diameters of one roller and one pulley at a given ratio.

In the above first to fourth embodiments, described are [the one] the outer diameter of the intermediate pulley is being made smaller than the outer diameter of the upstream pulley at the given ratio between the outer diameter of the upstream pulley and the outer diameter of the intermediate pulley, the given ratio being "2n: 1" or "2n+1:2". However, any ratio other than these ratios may be adopted as the given ratio, provided that the adopted ratio allows a shift in the period of angular velocity changes. In view of manufacturing irregularities of each pulley, the outer diameter of each pulley is allowed to have a margin of error of ±5%. In addition, given the fact that a roller with a smaller outer diameter has a shorter service life, it is preferable that the outer diameter of the intermediate pulley be 45% to 70% of the outer diameter of the upstream pulley.

In the above first to fourth embodiments, the outer diameter of the intermediate pulley is made smaller than the outer diameter of the upstream pulley at the given ratio. However, contrary to that, the outer diameter of the upstream pulley may be made smaller than the outer diameter of the intermediate pulley at a given ratio. Furthermore, the outer diameter of the downstream pulley may be made smaller than the outer diameter of the upstream pulley at a given ratio, or the outer diameter of the downstream pulley may be made smaller than the outer diameter of the intermediate pulley at a given ratio, or the outer diameter of the upstream pulley may be made smaller than the outer diameter of the downstream pulley at a given ratio.

In the above first to fourth embodiments, it has been described that phase alignment according to respective eccentricities of the upstream pulley, the intermediate pulley, and the downstream pulley is unnecessary. However, phase alignment may be carried out such that, for example, eccentricities of pulleys are measured during a manufacturing process or maintenance work and that the pulleys are aligned in phase so that amplitudes of angular velocities of the pulleys are canceled out each other.

According to the present invention, a change in the surface speed of a roller, the change being caused by an eccentricity of a pulley or the roller, can be reduced in a simple configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-101994, filed Jun. 18, 2021 which is hereby incorporated by reference herein in its entirety.

What is claimed is:

1. An image reading apparatus comprising:
a conveyance unit including a first driving roller and a second driving roller and configured to convey a sheet;
an image reading unit configured to read an image on the sheet conveyed by the conveyance unit at a reading position between the first driving roller and the second driving roller in a sheet conveyance direction;
a driving source configured to output a driving force for driving the first driving roller and the second driving roller;
a first pulley fixed to the first driving roller;
a second pulley fixed to the second driving roller; and
a transmission belt wound around a belt-wound-part of the first pulley and a belt-wound-part of the second pulley,
wherein an outer diameter of the belt-wound-part of the second pulley is smaller than an outer diameter of the belt-wound-part of the first pulley.

2. The image reading apparatus according to claim 1,
wherein the outer diameter of the belt-wound-part of the second pulley is smaller than the outer diameter of the belt-wound-part of the first pulley at a predetermined ratio, and
wherein an outer diameter of the second driving roller is smaller than an outer diameter of the first driving roller at the predetermined ratio.

3. The image reading apparatus according to claim 2, wherein the predetermined ratio is 2n: 1, where n is an integer.

4. The image reading apparatus according to claim 2, wherein the predetermined ratio is 2n+1:2, where n is an integer.

5. The image reading apparatus according to claim 1, wherein the outer diameter of the belt-wound-part of the second pulley is equal to or more than 45% and equal to or less than 70% of the outer diameter of the belt-wound-part of the first pulley.

6. The image reading apparatus according to claim 1,
wherein the conveyance unit includes a plurality of driving rollers configured to convey a sheet, and
wherein the second driving roller is configured to convey the sheet next to the first driving roller among the plurality of driving rollers.

7. The image reading apparatus according to claim 6, further comprising a third pulley,
wherein the conveyance unit includes a third driving roller configured to convey a sheet next to the second driving roller among the plurality of driving rollers,
wherein the driving source is configured to output a driving force for driving the first driving roller, the second driving roller, and the third driving roller,
wherein the third pulley is fixed to the third driving roller, and
wherein the transmission belt is wound around the first pulley, the second pulley, and the third pulley.

8. The image reading apparatus according to claim 7,
wherein an outer diameter of the third driving roller is equal to the outer diameter of the first driving roller, and
wherein an outer diameter of a belt-wound-part of the third pulley is equal to the outer diameter of the belt-wound-part of the first pulley, with the transmission belt being wound around the belt-wound-part of the third pulley.

9. The image reading apparatus according to claim 7, the image reading unit being a first image reading unit configured to read an image on a first surface of a sheet, the image reading apparatus further comprising:
a second image reading unit configured to read an image on a second surface opposite to the first surface of the sheet conveyed by the conveyance unit,
wherein the first image reading unit is configured to read an image on the first surface of the sheet at a first reading position between the first driving roller and the second driving roller in the sheet conveyance direction, and
wherein the second image reading unit is configured to read an image on the second surface of the sheet at a second reading position between the second driving roller and the third driving roller in the sheet conveyance direction.

10. The image reading apparatus according to claim 6, the transmission belt being a first transmission belt, the image reading apparatus further comprising:
a third pulley; and
a second transmission belt,
wherein the conveyance unit includes a third driving roller configured to convey a sheet next to the second driving roller among the plurality of driving rollers,
wherein the driving source is configured to output a driving force for driving the first driving roller, the second driving roller, and the third driving roller,
wherein the third pulley is fixed to the third driving roller,
wherein the second transmission belt is wound around the belt-wound-part of the second pulley and a belt-wound-part of the third pulley, and
wherein an outer diameter of the belt-wound-part of the second pulley is made smaller than an outer diameter of the belt-wound-part of the third pulley at a predetermined ratio, and wherein an outer diameter of the second driving roller is made smaller than an outer diameter of the third driving roller at the predetermined ratio as well.

11. The image reading apparatus according to claim 1, further comprising:
   an output pulley fixed to an output shaft of the driving source;
   an input pulley fixed to the first driving roller; and
   a driving belt wound around the output pulley and the input pulley.

12. An image forming apparatus comprising:
   a conveyance unit including a first driving roller and a second driving roller and configured to convey a sheet;
   an image reading unit configured to read an image on the sheet conveyed by the conveyance unit at a reading position between the first driving roller and the second driving roller in a sheet conveyance direction;
   a driving source configured to output a driving force for driving the first driving roller and the second driving roller;
   a first pulley fixed to the first driving roller;
   a second pulley fixed to the second driving roller;
   a transmission belt wound around a belt-wound-part of the first pulley and a belt-wound-part of the second pulley; and
   an image forming unit configured to form the image, read by the image reading unit from the sheet, on a different sheet,
   wherein an outer diameter of the belt-wound-part of the second pulley is smaller than an outer diameter of the belt-wound-part of the first pulley.

* * * * *